United States Patent
Zhao et al.

(10) Patent No.: US 12,423,915 B2
(45) Date of Patent: Sep. 23, 2025

(54) DISTRIBUTION CONTROL SYSTEM, DISTRIBUTION CONTROL APPARATUS, DISTRIBUTION CONTROL METHOD, AND PROGRAM

(71) Applicant: NIPPON TELEGRAPH AND TELEPHONE CORPORATION, Tokyo (JP)

(72) Inventors: Xiaotian Zhao, Tokyo (JP); Takafumi Okuyama, Tokyo (JP); Hiroyuki Kitada, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 158 days.

(21) Appl. No.: 18/557,268

(22) PCT Filed: Apr. 30, 2021

(86) PCT No.: PCT/JP2021/017244
§ 371 (c)(1),
(2) Date: Oct. 25, 2023

(87) PCT Pub. No.: WO2022/230186
PCT Pub. Date: Nov. 3, 2022

(65) Prior Publication Data
US 2024/0144602 A1    May 2, 2024

(51) Int. Cl.
*G06T 17/20* (2006.01)
*G06T 15/20* (2011.01)
(Continued)

(52) U.S. Cl.
CPC ............ *G06T 17/205* (2013.01); *G06T 15/20* (2013.01); *H04N 21/234345* (2013.01);
(Continued)

(58) Field of Classification Search
None
See application file for complete search history.

(56) References Cited

U.S. PATENT DOCUMENTS

2022/0053224 A1    2/2022  Katsumata et al.
2022/0084300 A1*   3/2022  Izumi ................ G06T 15/04
(Continued)

FOREIGN PATENT DOCUMENTS

WO    2020137876 A1    7/2020
WO    2020116154 A1   10/2021

OTHER PUBLICATIONS

Gül et al. (2020) "Low-latency cloud-based volumetric video streaming using head motion prediction" NOSSDAV'20, Jun. 10, 2020, pp. 27-33.
(Continued)

*Primary Examiner* — Frank S Chen

(57) ABSTRACT

A distribution system according to one embodiment includes: an arrangement unit that arranges a plurality of virtual viewpoints around an object represented by stereoscopic data constituting stereoscopic video content; a first creation unit that creates, for each of the virtual viewpoints, one side stereoscopic data in which an amount of data of a portion of the object that cannot be visually recognized from the virtual viewpoint is reduced; and a distribution unit that distributes one side stereoscopic data of one virtual viewpoint among the one side stereoscopic data for each of the virtual viewpoints to a terminal of a user according to a position and a field of view of the user in a virtual space in which the object is arranged.

20 Claims, 9 Drawing Sheets

(51) Int. Cl.
  *H04N 21/2343* (2011.01)
  *H04N 21/81* (2011.01)
(52) U.S. Cl.
  CPC ....... *H04N 21/816* (2013.01); *G06T 2210/08* (2013.01); *G06T 2210/36* (2013.01)

(56) References Cited

U.S. PATENT DOCUMENTS

2023/0071828 A1\* 3/2023 Shimizu .................. G06F 3/017
2023/0260199 A1\* 8/2023 Fukuyasu ............... G06T 15/20
                                                        345/419

OTHER PUBLICATIONS

Orts-Escolano et al. (2016) "Holoportation: Virtual 3D teleportation in real-time" UIST 2016, Oct. 16, 2016, pp. 741-754.
Arcturus Studios Holdings, Inc., "Holostream" Arcturus [online] Accessed on Mar. 30, 2021, website: https://arcturus.studio/holostream.

\* cited by examiner

Fig. 6

| VIRTUAL VIEWPOINT | VIEWING ANGLE RANGE |
|---|---|
| VIEWPOINT $V_1$ | $\theta_1 - \theta_{11} \leqq \theta_1 < \theta_1 + \theta_{12}$ |
| VIEWPOINT $V_2$ | $\theta_2 - \theta_{21} \leqq \theta_2 < \theta_2 + \theta_{22}$ |
| ... | ... |
| VIEWPOINT $V_N$ | $\theta_N - \theta_{N1} \leqq \theta_N < \theta_N + \theta_{N2}$ |

DISTRIBUTION CONTROL SYSTEM, DISTRIBUTION CONTROL APPARATUS, DISTRIBUTION CONTROL METHOD, AND PROGRAM

CROSS-REFERENCE TO RELATED APPLICATIONS

This application is a U.S. 371 Application of International Patent Application No. PCT/JP2021/017244, filed on 30 Apr. 2021, the disclosure of which is hereby incorporated herein by reference in its entirety.

TECHNICAL FIELD

The present invention relates to a distribution control system, a distribution control device, a distribution control method, and a program.

BACKGROUND ART

Stereoscopic video content with six degrees of freedom (6DoF) typified by volumetric videos and holograms, is known. In order to distribute such content with high quality through communication networks, in addition to using an advanced data compression technique and a communication network/system load distribution technique, it is necessary to have a mechanism for controlling the distribution of the content itself. In particular, it is important to have a mechanism for dynamically controlling the distribution of content in accordance with field-of-view information of an XR (VR/AR/MR/SR, etc.) device serving as a client, position information of a user in a virtual space, and the like.

A volumetric video is animation data composed of polygon meshes (hereinafter simply referred to as "mesh") and textures, and can be displayed and viewed on a display by rendering together with a virtual environment on the client side.

Techniques described in NPL 1 to 3 are known as volumetric video distribution techniques. NPL 1 proposes a method of rendering a volumetric video on the server side on the basis of head movement of a user detected by an AR/VR device which is a client, and transmitting the rendered volumetric video to the client as 2D data. In addition, NPL 2 proposes a method of distributing a volumetric video generated in real time to a client and rendering the distributed volumetric video on the client side. Further, NPL 3 proposes a method of reducing the amount of data required for reproduction by dynamically changing the level of detail of the volumetric video in accordance with the bandwidth of the communication network.

CITATION LIST

Non Patent Literature

[NPL 1] Serhan Gul, Dimitri Podborski, Thomas Buchholz, Thomas Schierl and Cornelius Hellge, "Low-latency cloud-based volumetric video streaming using head motion prediction," NOSSDAV '20: Proceedings of the 30th ACM Workshop on Network and Operating Systems Support for Digital Audio and Video, June 2020, Pages 27-33
[NPL 2] Sergio Orts-Escolano, Christoph Rhemann, Sean Fanello, Wayne Chang, Adarsh Kowdle, Yury Degtyarev, et al. "Holoportation: Virtual 3D teleportation in real-time," UIST '16: Proceedings of the 29th Annual Symposium on User Interface Software and Technology, October 2016, Pages 741-754
[NPL 3] Holostream/Arctrus, Internet <URL: https://arcturus.studio/holostream>

SUMMARY OF INVENTION

Technical Problem

Incidentally, since the volumetric video has a large amount of data and a large bandwidth of a communication network necessary for the distribution, there is a demand for a method of efficiently distributing the volumetric video.

However, in the method proposed in NPL 1 above, since it is necessary to perform rendering for each user on the server side, the load of the server is large. Also, when the number of users increases, the division of server resources may cause deterioration in the quality of video viewed by each user. Further, it is necessary to transmit the position information from the client to the server with a low delay at a high frequency, and for example, suppressing a Motion to Photon delay at which VR sickness begins to occur to 20 ms or less imposes a heavy burden on both the communication network and the server.

On the other hand, in the method proposed in NPL 2 above, 4 Gbps is required for the communication band, but it is difficult for the user to always stably secure the communication band of 4 Gbps. In addition, since the load of the communication network is large, the available bandwidth of another user using the same communication network is narrowed, and the quality of experience of the other user deteriorates.

Further, in the method proposed in NPL 3 above, when the available bandwidth of the communication network is narrow, the image quality and the level of detail including 3D data of the range visible to the user (that is, 3D data corresponding to the front for the user) in the volumetric video being viewed are degraded, resulting in a significant drop in quality of experience.

One embodiment of the present invention has been made in view of the above-mentioned points, and an object of the present invention is to reduce the amount of data required for distribution of stereoscopic video content while maintaining the quality of experience of a user.

Solution to Problem

In order to achieve the object, a distribution system according to one embodiment includes: an arrangement unit that arranges a plurality of virtual viewpoints around an object represented by stereoscopic data constituting stereoscopic video content; a first creation unit that creates, for each of the virtual viewpoints, one side stereoscopic data in which an amount of data of a portion of the object that cannot be visually recognized from the virtual viewpoint is reduced; and a distribution unit that distributes one side stereoscopic data of one virtual viewpoint among the one side stereoscopic data for each of the virtual viewpoints to a terminal of a user according to a position and a field of view of the user in a virtual space in which the object is arranged.

Advantageous Effects of Invention

The amount of data required for distribution of stereoscopic video content can be reduced while maintaining the quality of experience of a user.

BRIEF DESCRIPTION OF DRAWINGS

FIG. 6 is a diagram illustrating an example of a viewing angle range correspondence table.

DESCRIPTION OF EMBODIMENTS

An embodiment of the present invention will be described below. In the present embodiment, description will be given of a distribution control system 1 capable of reducing the amount of data required for distribution while maintaining the quality of experience of a user with respect to a volumetric video as an example of stereoscopic video content. Here, the volumetric video is animation data composed of 3D data (also called three-dimensional data or stereoscopic data) represented by meshes and textures. That is, for example, if 3D data of a frame at time t is denoted by $d_t$, the volumetric video is expressed as $\{d_t | t \in [t_s, t_e]\}$. $t_s$ denotes the start time of the volumetric video, and $t_e$ denotes the end time.

The embodiments described below are not limited to the volumetric video, and can be similarly applied to, for example, stereoscopic video content with six degrees of freedom such as a hologram.

<Overall Configuration>

Figure 1:
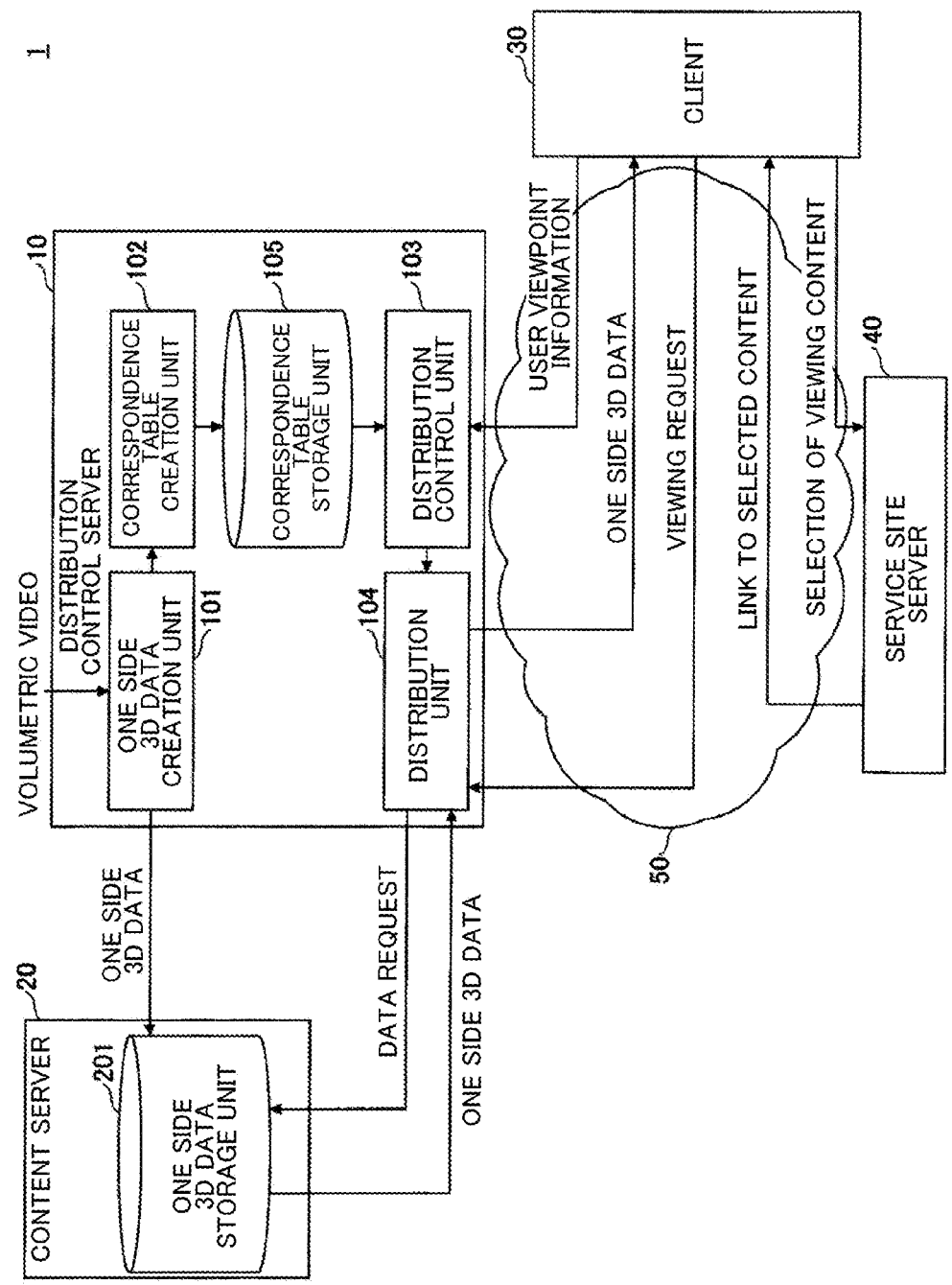
FIG. 1 is a diagram illustrating an example of an overall configuration of a distribution control system according to the present embodiment.

First, an overall configuration of the distribution control system 1 according to the present embodiment will be described with reference to FIG. 1. FIG. 1 is a diagram illustrating an example of an overall configuration of the distribution control system 1 according to the present embodiment.

As illustrated in FIG. 1, the distribution control system 1 according to the present embodiment includes a distribution control server 10, a content server 20, a client 30, and a service site server 40. The distribution control server 10 and the client 30 are communicatively connected via a communication network N such as the Internet. Similarly, the client 30 and the service site server 40 are communicatively connected via the communication network N.

It is assumed that the distribution control server 10 and the content server 20 are on the same local network and are communicatively connected on the local network, but the present invention is not limited thereto, and for example, they may be communicatively connected via the communication network N.

The distribution control server 10 creates a plurality of pieces of one side 3D data from 3D data constituting the given volumetric video, and stores the plurality of pieces of one side 3D data in the content server 20. Here, the one side 3D data is three-dimensional data for when an object represented by 3D data constituting the volumetric video is viewed from one viewpoint, and is data of which the amount is reduced more than that of the original 3D data while the quality of experience of a user is maintained. The object is a subject of a volumetric video, and can be any object that can be represented by meshes and textures, such as a person, animal, plant, structure, building, machine, celestial body, natural phenomenon, or the like.

In response to a viewing request from the client 30, the distribution control server 10 determines appropriate one side 3D data from the viewpoint, a spatial position, a field of view (a line-of-sight direction and a field-of-view range), etc. of the user, and distributes this one side 3D data to the client 30. The viewpoint and the spatial position of the user are the position of the user in a virtual space in which the object is arranged.

The content server 20 stores a plurality of pieces of one side 3D data. In response to a data request from the distribution control server 10, the content server 20 returns one side 3D data corresponding to the data request to the distribution control server 10.

The client 30 is any of various terminals (for example, XR (VR/AR/MR/SR, etc.) devices, etc.) used by a user who views the volumetric video, and renders the one side 3D data distributed from the distribution control server 10 and plays back the volumetric video. Note that XR devices include not only head mount displays (HMDs) but also smartphones, tablet terminals, wearable devices, etc. on which application programs functioning as XR devices are installed.

When the user views the volumetric video, for example, the following procedure is performed. First, the user accesses the service site server 40 through the client 30, and acquires a list of content (volumetric video) that the user can view. Then, the user selects a volumetric video that they desire to view from the list and obtains a link to the selected volumetric video. When the client 30 accesses the link, a viewing request is transmitted to the distribution control server 10, and playback of the volumetric video is started by returning one side 3D data to the request.

Further, the client 30 appropriately transmits information such as a viewpoint, a spatial position, a field of view, etc. of a user (hereinafter, information representing a viewpoint or a spatial position and a field of view of a user is also referred to as "user viewpoint information") to the distribution control server 10. Thus, one side 3D data corresponding to the viewpoint, the spatial position, the field of view, etc. of the user is returned from the distribution control server 10 and reproduced by the client 30.

The service site server 40 presents a list of content (volumetric video) that the user can view, and provides a link to content selected from the list to the client 30.

Here, the distribution control server 10 according to the present embodiment includes a one side 3D data creation unit 101, a correspondence table creation unit 102, a distribution control unit 103, and a distribution unit 104. These units are implemented by, for example, one or more programs installed in the distribution control server 10 causing a processor such as a central processing unit (CPU) to execute processing.

In addition, the distribution control server 10 according to the present embodiment includes a correspondence table storage unit 105. The correspondence table storage unit 105 is implemented by, for example, an auxiliary storage device such as a hard disk drive (HDD) or a solid state drive (SSD).

The one side 3D data creation unit 101 creates a plurality of pieces of one side 3D data from 3D data constituting the volumetric video given to the distribution control server 10. More specifically, the one side 3D data creation unit 101 arranges a plurality of virtual viewpoints at equal intervals (or unequal intervals) around an object represented by 3D data constituting the volumetric video, and then performs geometry simplification processing (level of detail reduction processing) on the mesh corresponding to the back surface of the object when the object is viewed from the virtual viewpoint for each virtual viewpoint, thereby creating one side 3D data. In this way, for each virtual viewpoint, by performing geometry simplification processing on the mesh corresponding to the back surface of the object represented by the 3D data (that is, the part that cannot be seen from the virtual viewpoint), one side 3D data for each virtual viewpoint is created.

Then, the one side 3D data creation unit 101 stores the plurality of pieces of created one side 3D data in the content server 20.

The correspondence table creation unit 102 creates a correspondence table in which each virtual viewpoint arranged when creating a plurality of pieces of one side 3D data is associated with a viewing angle range of the virtual viewpoint (hereinafter referred to as a "viewing angle range correspondence table"). The viewing angle range is a range in which the same quality of experience as when viewing an object as when viewing the object from the virtual viewpoint can be obtained. In other words, it is the range in which the back surface of the geometry-simplified object cannot be seen, similarly to the virtual viewpoint.

Upon receiving the user viewpoint information from the client 30, the distribution control unit 103 refers to the viewing angle range correspondence table and determines appropriate one side 3D data from the user viewpoint information. More specifically, when at least a part of the object is captured within the field of view at a viewpoint or a spatial position included in the user viewpoint information, the distribution control unit 103 specifies a virtual viewpoint corresponding to a viewing angle range including the viewpoint or the spatial position, and determines one side 3D data corresponding to the specified virtual viewpoint as appropriate one side 3D data.

The distribution unit 104 transmits the one side 3D data determined by the distribution control unit 103 to the client 30.

The correspondence table storage unit 105 stores the viewing angle range correspondence table created by the correspondence table creation unit 102.

In addition, the content server 20 according to the present embodiment includes a one side 3D data storage unit 201. The one side 3D data storage unit 201 is implemented by an auxiliary storage device such as an HDD or an SSD.

The one side 3D data storage unit 201 stores each piece of one side 3D data created by the one side 3D data creation unit 101.

Note that the configuration of the distribution control system 1 illustrated in FIG. 1 is an example, and another configuration may be used. For example, the distribution control server 10 and the content server 20 may be constituted as an integral server.

<Details of Various Types of Processing>

Hereinafter, the processes of one side 3D data creation processing for creating a plurality of pieces of one side 3D data, correspondence table creation processing for creating a viewing angle range correspondence table, and distribution processing for distributing appropriate one side 3D data to the client 30 will be described. Note that the one side 3D data creation processing and the correspondence table creation processing are preprocessing executed before the distribution processing.

<<One Side 3D Data Creation Processing>>

Figure 2:
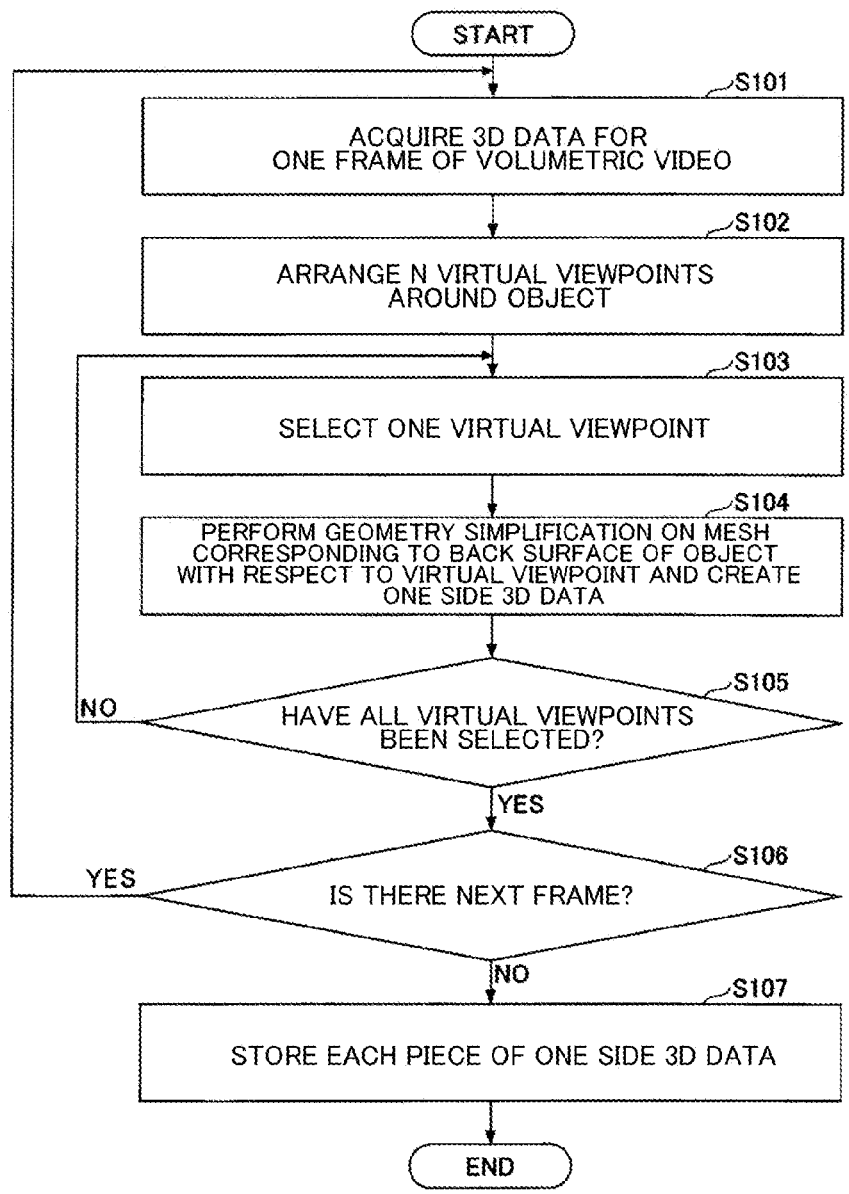
FIG. 2 is a flowchart illustrating an example of one side 3D data creation processing according to the present embodiment.

First, the one side 3D data creation processing will be described with reference to FIG. 2. FIG. 2 is a flowchart illustrating an example of one side 3D data creation processing according to the present embodiment. In the following description, it is assumed that the volumetric video is given to the distribution control server 10.

The one side 3D data creation unit 101 acquires 3D data for one frame from among 3D data constituting the volumetric video (step S101). In the following description, it is assumed that the one side 3D data creation unit 101 acquires 3D data $d_t$ of a frame at time t. The initial value of t only needs to be $t=t_s$.

Although the 3D data is composed of meshes and textures, since the textures are not particularly processed below, only the meshes of the 3D data may be acquired in step S101.

Next, the one side 3D data creation unit 101 arranges N virtual viewpoints around an object represented by the 3D data $d_t$ acquired in step S102 (step S102). Meanwhile, it is assumed that the line-of-sight direction of each virtual viewpoint is an object. For example, the one side 3D data creation unit 101 arranges N virtual viewpoints with the object in the line-of-sight direction at equal intervals (or unequal intervals) on a circumference of a circle having a predetermined radius with the object as a center. Note that N is a predetermined integer of 2 or more.

Figure 3:
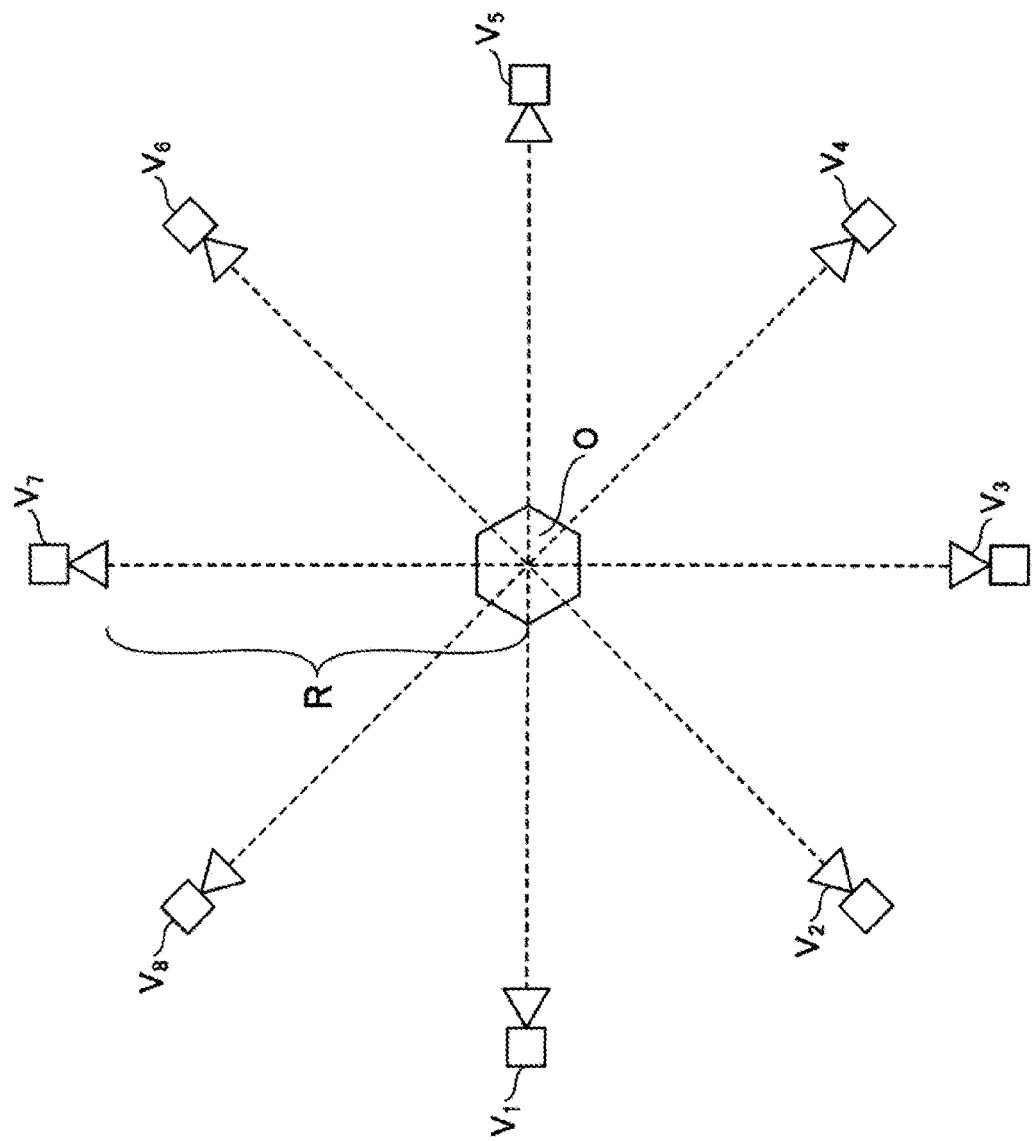
FIG. 3 is a diagram illustrating an example of arrangement of virtual viewpoints.

FIG. 3 illustrates an example of arrangement of virtual viewpoints when N=8. In the example illustrated in FIG. 3, virtual viewpoints $V_1$ to $V_8$ with an object O in the line-of-sight direction are arranged at equal intervals on a circumference of a circle having a radius R with the object O as a center.

It is to be noted that the virtual viewpoints are arranged on a circumference of a circle by way of example, and the present invention is not limited thereto, and for example, the virtual viewpoints may be arranged on the side or the vertex of a polygon with the object as the center. In the example illustrated in FIG. 3, for simplicity, the virtual viewpoints $V_1$ to $V_8$ are arranged on the xy plane of the xyz space with the center of the object O as an origin, but the present invention is not limited thereto, and for example, virtual viewpoints may be arranged on a spherical surface (or a polyhedron) with the origin as a center.

Next, the one side 3D data creation unit 101 selects one virtual viewpoint from among the N virtual viewpoints arranged in step S102 (step S103).

Next, when the object is viewed from the virtual viewpoint selected in step S103, the one side 3D data creation unit 101 performs geometry simplification processing (level of detail reduction processing) on a mesh corresponding to the back surface of the object (step S104). In other words, the one side 3D data creation unit 101 performs geometry simplification processing on meshes of portions that cannot be visually recognized (not visible) from the virtual viewpoint among the meshes constituting the object. Thus, when the object is viewed from the virtual viewpoint, the quality of experience equivalent to the original 3D data $d_t$ can be obtained, and one side 3D data in which the amount of data is reduced more than that of the original 3D data d<3881>t</3881> can be created.

Next, the one side 3D data creation unit 101 determines whether or not all the N virtual viewpoints have been selected (step S105).

When it is determined in step S105 that there is a virtual viewpoint that has not been selected yet, the one side 3D data creation unit 101 returns to step S103, selects one virtual viewpoint from among the virtual viewpoints that have not been selected yet, and executes processing after step S104.

On the other hand, when it is determined that all the N virtual viewpoints have been selected in step S105, the one side 3D data creation unit 101 determines whether or not there is a next frame in the given volumetric video (step S106).

When it is determined in step S106 that there is a next frame, the one side 3D data creation unit 101 returns to step S101, acquires 3D data of the next frame, and executes processing after step S102. That is, in this case, the one side 3D data creation unit 101 returns to step S101 as t←t+1, and acquires the 3D data $d_t$ of the frame at the next time t.

On the other hand, when it is determined that there is no next frame in step S106 (that is, when time $t=t_e$), a one side 3D data creation unit 101 stores each piece of one side 3D data created in step S104 in the one side 3D data storage unit 201 of the content server 20 (step S107). Thus, for example, if one side 3D data corresponding to a viewpoint $V_i$ (where i∈[1, N]) at time t is denoted by $d_{ti}$, the set of one side 3D data $\{d_{ti}|t∈[t_s, t_e], i∈[1, N]\}$ is stored in the one side 3D data storage unit 201.

In the present embodiment, the number N of virtual viewpoints arranged is common to all frames, but may be different for each frame. In the present embodiment, steps S102 to S105 are repeatedly executed for each frame, but for example, in a certain time width (including the case where the time width is $t_e$–$t_s$), when the 3D data $d_t$ is the same between the frames, steps S102 to S105 may be executed only for the 3D data $d_t$ of one frame included in the time width.

<<Correspondence Table Creation Processing>>

Figure 4:
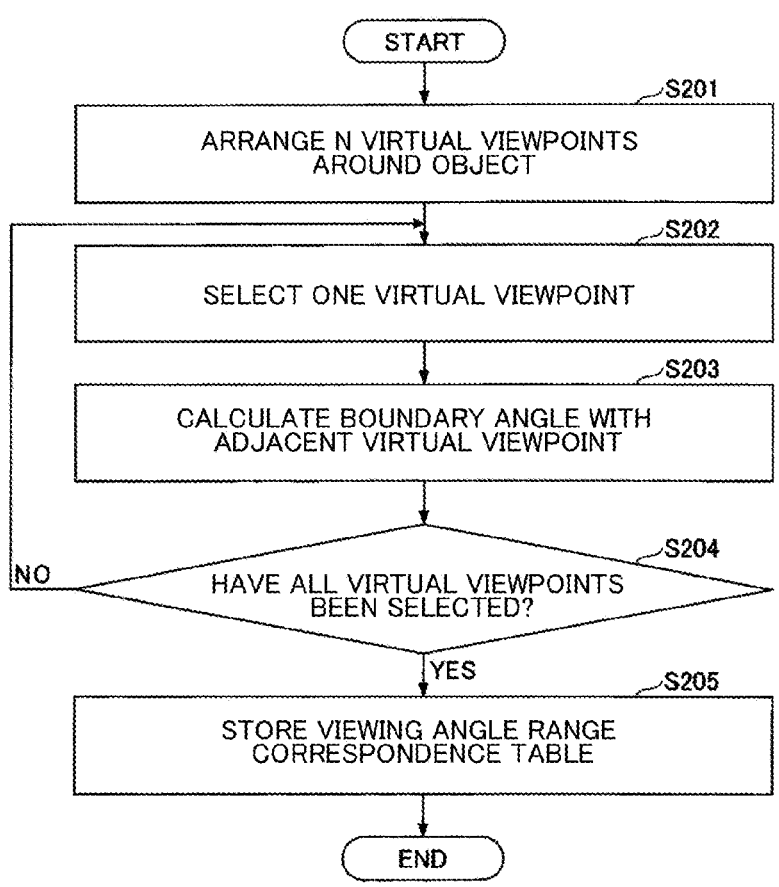
FIG. 4 is a flowchart illustrating an example of correspondence table creation processing according to the present embodiment.

Next, correspondence table creation processing will be described with reference to FIG. 4. FIG. 4 is a flowchart illustrating an example of correspondence table creation processing according to the present embodiment. A case of creating a viewing angle range correspondence table for 3D data $d_t$ (where t∈[$t_s$, $t_e$]) will be described below. In addition, in the following description, it is expressed as d=$d_t$.

The correspondence table creation unit 102 arranges N virtual viewpoints around the object represented by the 3D data d in the same manner as step S102 of FIG. 2 (step S201). The number of virtual viewpoints arranged and a method of arrangement (equal intervals or unequal intervals, arrangement on a circumference, or arrangement on a polygon, etc.) are the same as step S102 in FIG. 2.

Next, the correspondence table creation unit 102 selects one virtual viewpoint from among the N virtual viewpoints arranged in step S201 (step S202).

Next, the correspondence table creation unit 102 calculates a boundary angle between the virtual viewpoint selected in step S202 and a virtual viewpoint adjacent thereto (hereinafter referred to as an "adjacent virtual viewpoint") (step S203). The boundary angle is an angle between a line of sight of the virtual viewpoint and a boundary between the virtual viewpoint and an adjacent virtual viewpoint.

Figure 5:
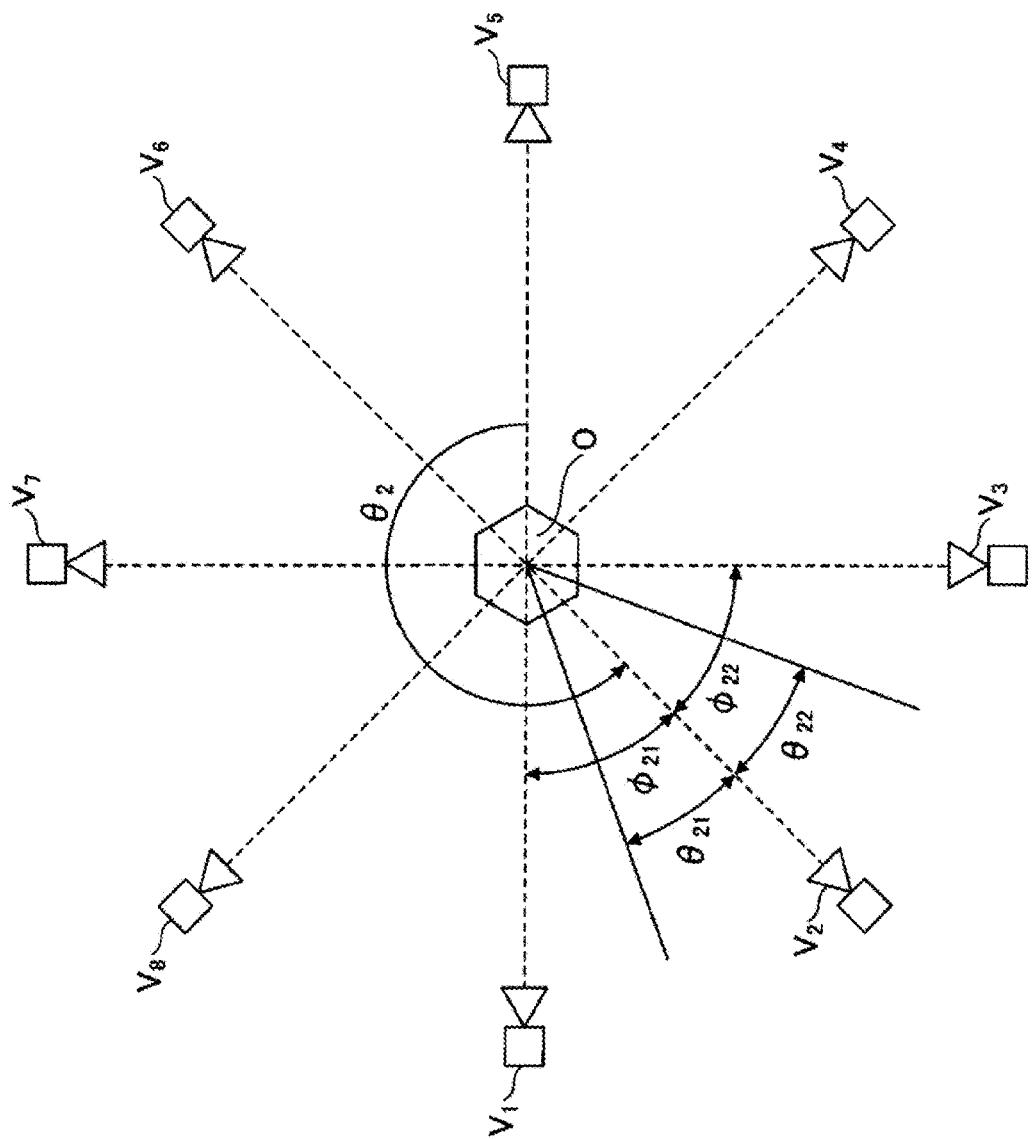
FIG. 5 is a diagram illustrating an example of viewing angle ranges.

Here, as an example, a case where the boundary angle of the virtual viewpoint $V_2$ is calculated with respect to the arrangement of the virtual viewpoint illustrated in FIG. 3 will be described. As illustrated in FIG. 5, it is assumed that the virtual viewpoint $V_2$ is positioned at an angle $θ_2$ with respect to the object O. In the example illustrated in FIG. 5, the positive direction of the x-axis on the XY plane with the center of the object O as the origin is used as the reference of the angle.

At this time, it is assumed that an adjacent virtual viewpoint of the virtual viewpoint $V_2$ is $V_1$ and $V_3$, an angle between the line of sight of the virtual viewpoint $V_2$ and the line of sight of the adjacent virtual viewpoint $V_1$ is $φ_{21}$, and an angle between the line of sight of the virtual viewpoint $V_2$ and the line of sight of the adjacent virtual viewpoint $V_3$ is $φ_{22}$. Then, a line dividing the angle $φ_{21}$ into two is defined as a boundary with the adjacent virtual viewpoint $V_1$, a line dividing the angle $φ_{22}$ into two is defined as a boundary with the adjacent virtual viewpoint $V_3$, and an angle up to these boundaries is defined as a boundary angle.

That is, $θ_{21}=φ_{21}/2$ and $θ_{22}=φ_{22}/2$, where $θ_{21}$ is a boundary angle with the adjacent virtual viewpoint $V_1$ and $θ_{22}$ is a boundary angle with the adjacent virtual viewpoint $V_3$.

The boundary angles $θ_{i1}$ and $θ_{i2}$ of the other virtual viewpoints $V_i$ (i=1, 3, . . . , 8) can be similarly calculated.

Next, the correspondence table creation unit 102 determines whether or not all the N virtual viewpoints have been selected (step S204).

When it is determined in step S204 that there is a virtual viewpoint that has not been selected yet, the correspondence table creation unit 102 returns to step S202, selects one virtual viewpoint from among the virtual viewpoints that have not been selected yet, and executes processing after step S203.

On the other hand, when it is determined in step S204 that all the N virtual viewpoints have been selected, the correspondence table creation unit 102 creates a viewing angle range correspondence table by calculating a viewing angle range of each virtual viewpoint from the boundary angle calculated in step S203, and stores the created viewing angle range correspondence table in the correspondence table storage unit 105 (step S205). If the virtual viewpoint $V_i$ (where i∈[1, N]) is positioned at an angle $θ_i$ with respect to the object, and the boundary angles of the virtual viewpoint $V_i$ are $θ_{i1}$ and $θ_{i2}$, the viewing angle range of the virtual viewpoint $V_i$ is calculated as $θ_i-θ_{i1}≤θ_i<θ_i+θ_{i2}$. Thus, a viewing angle range correspondence table is created by associating the virtual viewpoint $V_i$ with the viewing angle range $θ_i-θ_{i1}≤θ_i<θ_i+θ_{i2}$. FIG. 6 illustrates an example of the viewing angle range correspondence table created in this way.

Although a common viewing angle range correspondence table is created for the 3D data $d_t$ at time t∈[$t_s$, $t_e$] in the present embodiment, for example, when the number of virtual viewpoints arranged differs depending on the frame, a viewing angle range correspondence table may be created for each number of virtual viewpoints arranged.

<<Distribution Processing>>

Figure 7:
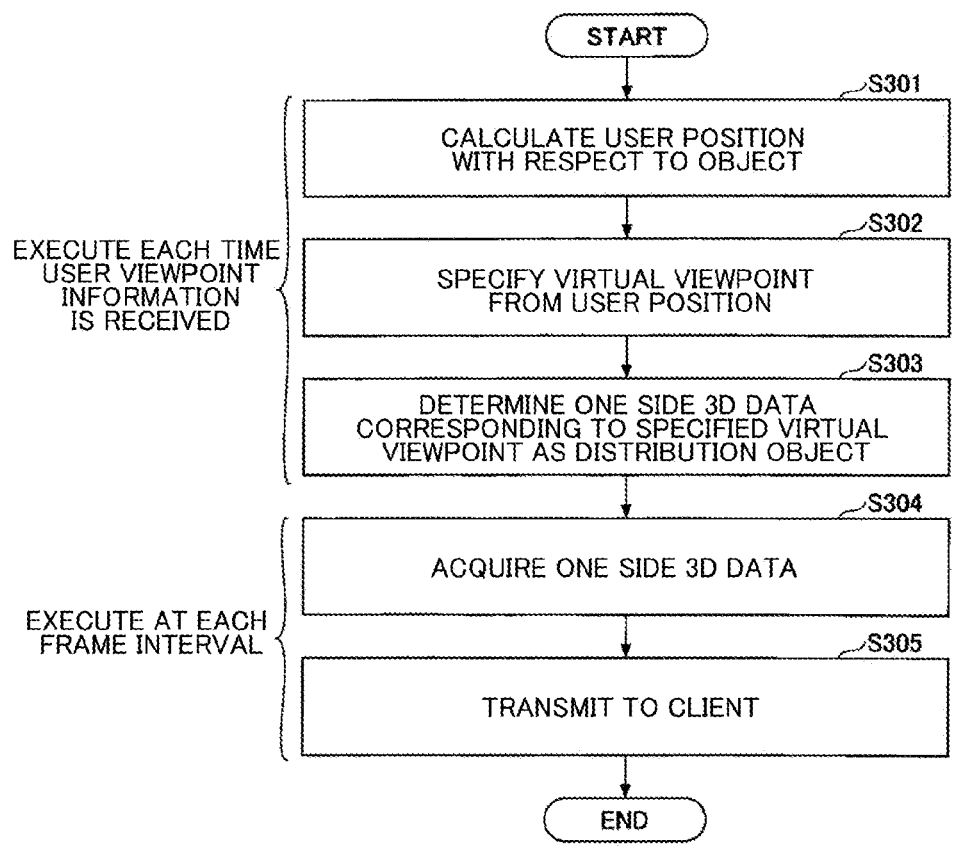
FIG. 7 is a flowchart illustrating an example of distribution processing according to the present embodiment.

Next, distribution processing will be described with reference to FIG. 7. FIG. 7 is a flowchart illustrating an example of distribution processing according to the present embodiment. Steps S301 to S303 below are executed every time user viewpoint information is received, and steps S304 to S305 below are executed at each frame interval. Meanwhile, in the following description, it is assumed that at least a part of the object is included in the field of view of the user.

The distribution control unit 103 calculates a user position with respect to the object by using a viewpoint or a spatial position included in the user viewpoint information received from the client 30 (step S301). Here, the user position is an angle of a viewpoint or a spatial position with respect to the object. The reference of the angle is the same as when the position of the virtual viewpoint with respect to the object is determined in step S203 of FIG. 4.

Next, the distribution control unit 103 refers to the viewing angle range correspondence table stored in the correspondence table storage unit 105 and specifies a virtual viewpoint from the user position calculated in step S301 (step S302). That is, the distribution control unit 103 specifies a virtual viewpoint corresponding to a viewing angle range including the user position among the virtual viewpoints.

Figure 8:
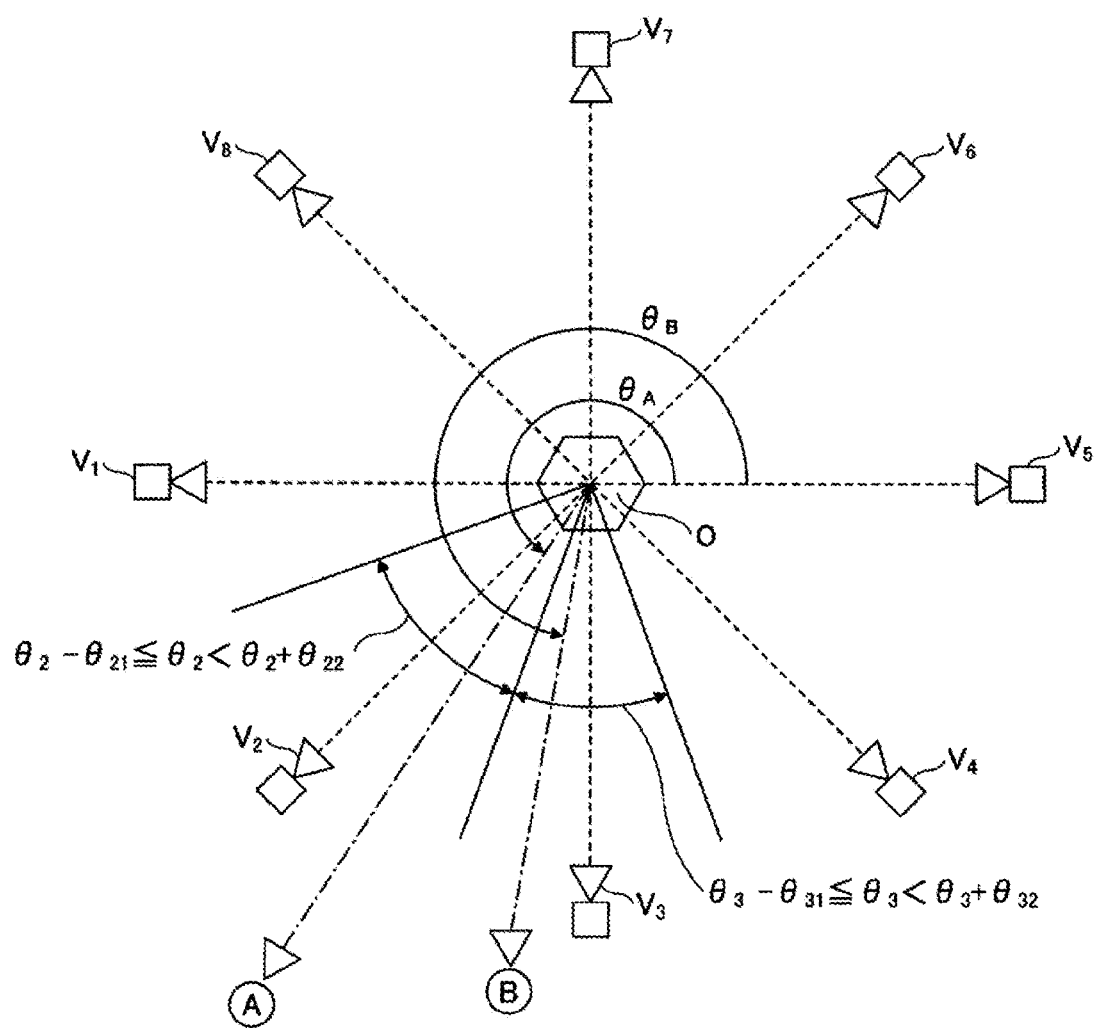
FIG. 8 is a diagram illustrating an example of specifying a virtual viewpoint.

For example, as illustrated in FIG. 8, it is assumed that $\theta_2 - \theta_{21} \leq \theta_A < \theta_2 + \theta_{22}$ where $\theta_A$ is the user position of a certain user A. In this case, the virtual viewpoint $V_2$ is specified in step S302.

For example, as illustrated in FIG. 8, it is assumed that $\theta_3 - \theta_{31} \leq \theta_B < \theta_3 + \theta_{32}$ where $\theta_B$ is the user position of a certain user B. In this case, the virtual viewpoint $V_3$ is specified in step S302.

In the example illustrated in FIG. 8, the object O exists in the line-of-sight direction of the user A, and at least a part of the object O is included in the field of view though the object O does not exist in the line-of-sight direction of the user B.

Next, the distribution control unit 103 determines one side 3D data corresponding to the virtual viewpoint specified in step S302 as a distribution object (step S303). That is, for example, when the virtual viewpoint specified in step S302 is $V_i$, the distribution control unit 103 determines one side 3D data $\{d_n\}$ as a distribution object.

The distribution unit 104 acquires the one side 3D data of the frame at the corresponding time from the content server 20 among the one side 3D data of the distribution object determined in step S303 (step S304).

Then, the distribution unit 104 distributes the one side 3D data acquired in step S304 to the client 30 (step S305). Thus, the one side 3D data is rendered on the client 30 side, and the object is displayed on the display.

<Hardware Configuration>

Finally, hardware configurations of the distribution control server 10 and the content server 20 according to the present embodiment will be described. The distribution control server 10 and the content server 20 according to the present embodiment are implemented by, for example, a hardware configuration of a computer 500 illustrated in FIG. 9. The client 30 and the service site server 40 may also be implemented in a similar hardware configuration.

Figure 9:
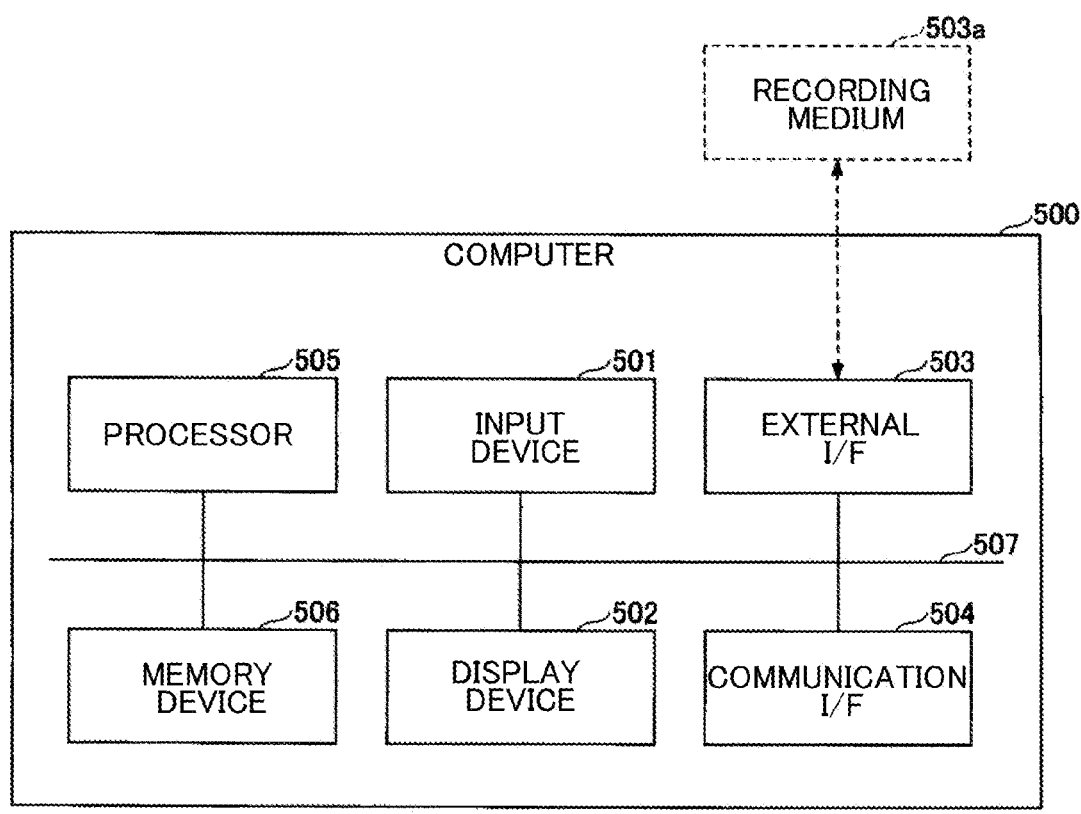
FIG. 9 is a diagram illustrating an example of a hardware configuration of a computer.

The computer 500 illustrated in FIG. 9 includes an input device 501, a display device 502, an external I/F 503, a communication I/F 504, a processor 505, and a memory device 506. Each of these pieces of hardware is communicatively connected via a bus 507.

The input device 501 is, for example, a keyboard, a mouse, a touch panel, or the like. The display device 502 is, for example, a display or the like. Note that the computer 500 may be provided without at least one of the input device 501 and the display device 502.

The external I/F 503 is an interface with an external device such as a recording medium 503a. Examples of the recording medium 503a include a compact disc (CD), a digital versatile disk (DVD), a secure digital (SD) memory card, a Universal Serial Bus (USB) memory card, and the like.

The communication I/F 504 is an interface for data communication with other devices, apparatuses, systems, and the like. The processor 505 is any of various arithmetic devices such as a CPU. The memory device 506 is any of various storage devices such as an HDD, an SSD, a random access memory (RAM), a read only memory (ROM), and a flash memory.

The distribution control server 10 and the content server 20 according to the present embodiment can implement various types of processing described above by having the hardware configuration of the computer 500 illustrated in FIG. 9. Note that the hardware configuration of the computer 500 illustrated in FIG. 9 is an example, and the computer 500 may have other hardware configurations. For example, the computer 500 may include a plurality of processors 505 or a plurality of memory devices 506.

<Conclusion>

As described above, the distribution control system 1 according to the present embodiment arranges a plurality of virtual viewpoints with respect to an object represented by 3D data constituting the stereoscopic video content, and then simplifies the geometry of the polygon mesh of a portion that cannot be visually recognized from the virtual viewpoint for each of the virtual viewpoints. Thereby, one side 3D data in which the amount of data is reduced more than that of the original 3D data is created for each virtual viewpoint.

Thus, by distributing the appropriate one side 3D data according to the position and the field of view of the user in the client 30, the amount of data required for distributing the stereoscopic video content can be reduced while maintaining the quality of experience of the user. In addition, since the rendering load on the client 30 side is reduced, it is possible to reduce the processing load on the client 30 side.

The present invention is not limited to the above-mentioned specifically disclosed embodiment, and various modifications and changes, combinations with a known technique, and the like can be made without departing from the scope of the claims.

REFERENCE SIGNS LIST

1 Distribution control system
10 Distribution control server
20 Content server
30 Client
40 Service site server
50 Communication network
101 One side 3D data creation unit
102 Correspondence table creation unit
103 Distribution control unit
104 Distribution unit
105 Correspondence table storage unit
201 One side 3D data storage unit
500 Computer
501 Input device
502 Display device
503 External I/F
503a Recording medium
504 Communication I/F
505 Processor
506 Memory device
507 Bus

The invention claimed is:

1. A distribution control system comprising a processor configured to execute operations comprising:
generating a plurality of virtual viewpoints around an object represented by stereoscopic data, wherein the stereoscopic data form at least a part of stereoscopic video content;

creating, for each virtual viewpoint of the plurality of
virtual viewpoints, a piece of side stereoscopic data,
wherein the piece of side stereoscopic data has a
reduced amount of data according to a portion of the
object that is visually unrecognizable from the virtual
viewpoint; and distributing the piece of side stereoscopic data of the
virtual viewpoint among the piece of side stereoscopic
data for each virtual viewpoint of the plurality of virtual
viewpoints to a terminal of a user according to a
position and a field of view of the user in a virtual space
of the object.

2. The distribution control system according to claim 1, wherein the creating the piece of side stereoscopic data further comprises:

creating the piece of side stereoscopic data in which the reduced amount of data of the portion is reduced by performing geometry simplification processing on a polygon mesh representing the portion that cannot be visually recognized from the virtual viewpoint.

3. The distribution control system according to claim 2, wherein the portion that is visually unrecognizable from the virtual viewpoint includes a back surface portion of the object when the object is viewed from the virtual viewpoint.

4. The distribution control system according to claim 1, wherein the portion that is visually unrecognizable from the virtual viewpoint includes a back surface portion of the object when the object is viewed from the virtual viewpoint.

5. The distribution control system according to claim 1, the processor further configured to execute operations comprising:

creating a correspondence table, wherein the correspondence table includes the virtual viewpoint and a range in which the same quality of experience is obtained when the object is viewed from the virtual viewpoint are associated with each other, wherein the distributing the piece of side stereoscopic data of the virtual viewpoint further comprises:

specifying, by referring to the correspondence table, the piece of side stereoscopic data of a virtual viewpoint corresponding to a range including the position when at least a part of the object is included in the field of view, and distributing the specified piece of side stereoscopic data to the terminal.

6. The distribution control system according to claim 1, wherein the piece of side stereoscopic data has the reduced amount of data according to a surface of the object that is hidden from the virtual viewpoint.

7. The distribution control system according to claim 1, wherein the reduced amount of data is based on a reduced level of rendering details of the portion of the object.

8. A distribution control device comprising a processor configured to execute operations comprising:

generating a plurality of virtual viewpoints around an object represented by stereoscopic data, wherein the stereoscopic data form at least a part of stereoscopic video content;

creating, for each viewpoint of the plurality of virtual viewpoints, a piece of side stereoscopic data, wherein the piece of side stereoscopic data has a reduced amount of data according to a portion of the object that is visually unrecognizable from the virtual viewpoint; and distributing the piece of side stereoscopic data of the virtual viewpoint among the piece of side stereoscopic data for each virtual viewpoint of the plurality of virtual viewpoints to a terminal of a user according to a position and a field of view of the user in a virtual space of the object.

9. The distribution control device according to claim 8, wherein the creating the piece of side stereoscopic data further comprises:

creating the piece of side stereoscopic data in which the reduced amount of data of the portion is reduced by performing geometry simplification processing on a polygon mesh representing the portion that cannot be visually recognized from the virtual viewpoint.

10. The distribution control device according to claim 8, wherein the portion that is visually unrecognizable from the virtual viewpoint includes a back surface portion of the object when the object is viewed from the virtual viewpoint.

11. The distribution control device according to claim 8, the processor further configured to execute operations comprising:

creating a correspondence table, wherein the correspondence table includes in which the virtual viewpoint and a range in which the same quality of experience is obtained when the object is viewed from the virtual viewpoint are associated with each other, wherein the distributing the piece of side stereoscopic data of the virtual viewpoint further comprises:

specifying, by referring to the correspondence table, the piece of side stereoscopic data of a virtual viewpoint corresponding to a range including the position when at least a part of the object is included in the field of view, and distributing the specified piece of side stereoscopic data to the terminal.

12. The distribution control device according to claim 8, wherein the piece of side stereoscopic data has the reduced amount of data according to a surface of the object that is hidden from the virtual viewpoint.

13. The distribution control device according to claim 8, wherein the reduced amount of data is based on a reduced level of rendering details of the portion of the object.

14. A computer implemented method for distributing side stereoscopic data, comprising:

generating a plurality of virtual viewpoints around an object represented by stereoscopic data, wherein the stereoscopic data form at least a part of stereoscopic video content;

creating, for each virtual viewpoint of the plurality of virtual viewpoints, a piece of side stereoscopic data, wherein the piece of side stereoscopic data has a reduced amount of data of a portion of the object that is visually unrecognizable from the virtual viewpoint; is reduced; and distributing the piece of side stereoscopic data of the virtual viewpoint among the piece of side stereoscopic data for each virtual viewpoint of the plurality of virtual viewpoints to a terminal of a user according to a position and a field of view of the user in a virtual space of the object.

15. The computer implemented method according to claim 14, wherein the creating the piece of side stereoscopic data further comprises:

creating the piece of side stereoscopic data in which the reduced amount of data of the portion is reduced by performing geometry simplification processing on a polygon mesh representing the portion that cannot be visually recognized from the virtual viewpoint.

16. The computer implemented method according to claim 14, wherein the portion that is visually unrecognizable from the virtual viewpoint includes a back surface portion of the object when the object is viewed from the virtual viewpoint.

17. The computer implemented method according to claim 14, further comprising:
   creating a correspondence table, wherein the correspondence table includes in which the virtual viewpoint and a range in which the same quality of experience is obtained when the object is viewed from the virtual viewpoint are associated with each other, wherein the distributing the piece of side stereoscopic data of the virtual viewpoint further comprises:
   specifying, by referring to the correspondence table, the piece of side stereoscopic data of a virtual viewpoint corresponding to a range including the position when at least a part of the object is included in the field of view, and distributing the specified piece of side stereoscopic data to the terminal.

18. The computer implemented method according to claim 14, wherein the piece of side stereoscopic data has the reduced amount of data according to a surface of the object that is hidden from the virtual viewpoint.

19. The computer implemented method according to claim 14, wherein the reduced amount of data is based on a reduced level of rendering details of the portion of the object.

20. The computer implemented method according to claim 15, further comprising:
   creating a correspondence table, wherein the correspondence table includes in which the virtual viewpoint and a range in which the same quality of experience is obtained when the object is viewed from the virtual viewpoint are associated with each other,
   wherein the distributing the piece of side stereoscopic data of the virtual viewpoint further comprises:
   specifying, by referring to the correspondence table, the piece of side stereoscopic data of a virtual viewpoint corresponding to a range including the position when at least a part of the object is included in the field of view, and
   distributing the specified piece of side stereoscopic data to the terminal.

* * * * *